United States Patent [19]
Francart, Jr.

[11] Patent Number: 5,865,603
[45] Date of Patent: Feb. 2, 1999

[54] MULTI-COMPRESSION COIL SPRINGS FOR A LIQUID PUMP

[76] Inventor: Armand Francart, Jr., Rte. 896, R.D. No. 2, Box 119z, Landenberg, Pa. 19350

[21] Appl. No.: 707,955

[22] Filed: Sep. 10, 1996

[51] Int. Cl.$^6$ ...................................................... F04B 9/08
[52] U.S. Cl. .......................................................... 417/133
[58] Field of Search .................................. 417/133, 134, 417/126

[56] References Cited

U.S. PATENT DOCUMENTS

| | | | |
|---|---|---|---|
| Re. 34,957 | 5/1995 | Armand | 417/133 |
| 5,141,405 | 8/1992 | Armand | 417/133 |
| 5,426,990 | 6/1995 | Armand | 74/101.1 |

*Primary Examiner*—Timothy Thorpe
*Assistant Examiner*—Daniel E. Moses
*Attorney, Agent, or Firm*—Sughrue, Mion, Zinn, Macpeak & Seas, PLLC

[57] ABSTRACT

A snap-over toggle linkage valve actuating mechanism for alternately opening and closing a gas inlet valve and a gas outlet valve utilizes a plurality of stiff compression coil springs of an axial length preferably less than four times the coil turn diameter mounted between oppositely facing end plates, with the compression coil ends carried by circular bosses symmetrically positioned on the faces of the opposing faces of the end plates bearing the coil springs and constituting a second toggle link for the snap-over valve actuating mechanism. A gas pressure and a vent valve assembly consists of a valve actuator rod operatively coupled to the first toggle link and terminating in a right angle valve actuator plate fixed thereto at an off center lateral position. The valve actuator plate detachably mounts a valve stem of a poppet type vent valve whose large diameter plug seats in a chamfered valve seat radially outward of a combined guide plate and valve seat.

8 Claims, 4 Drawing Sheets

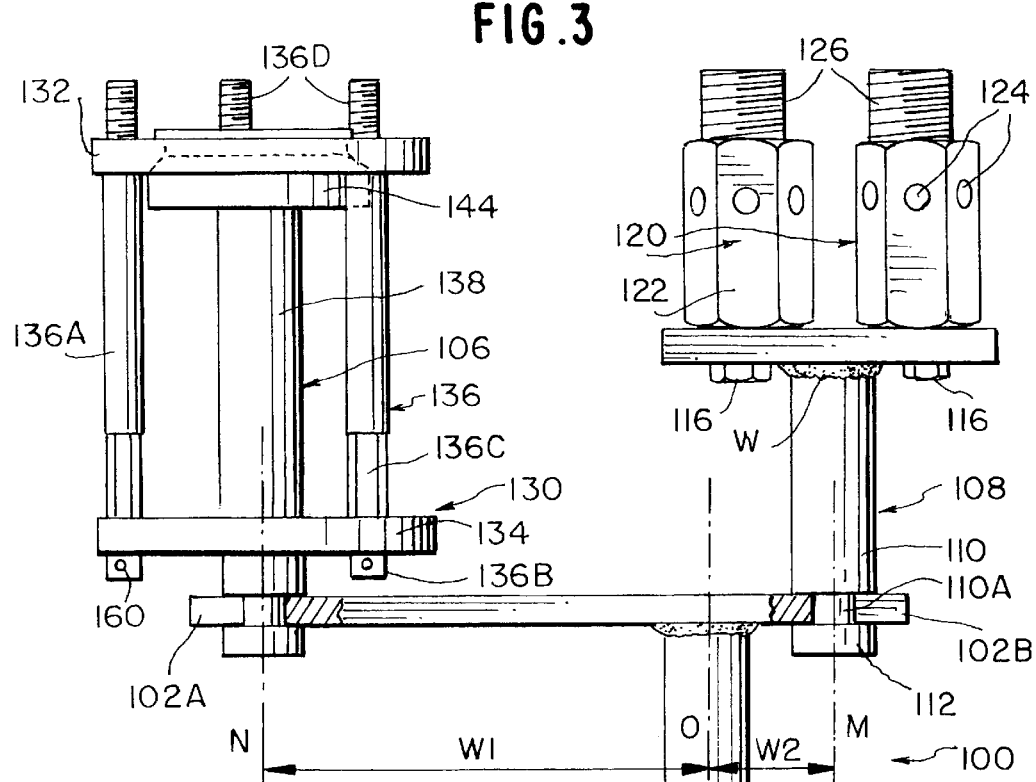
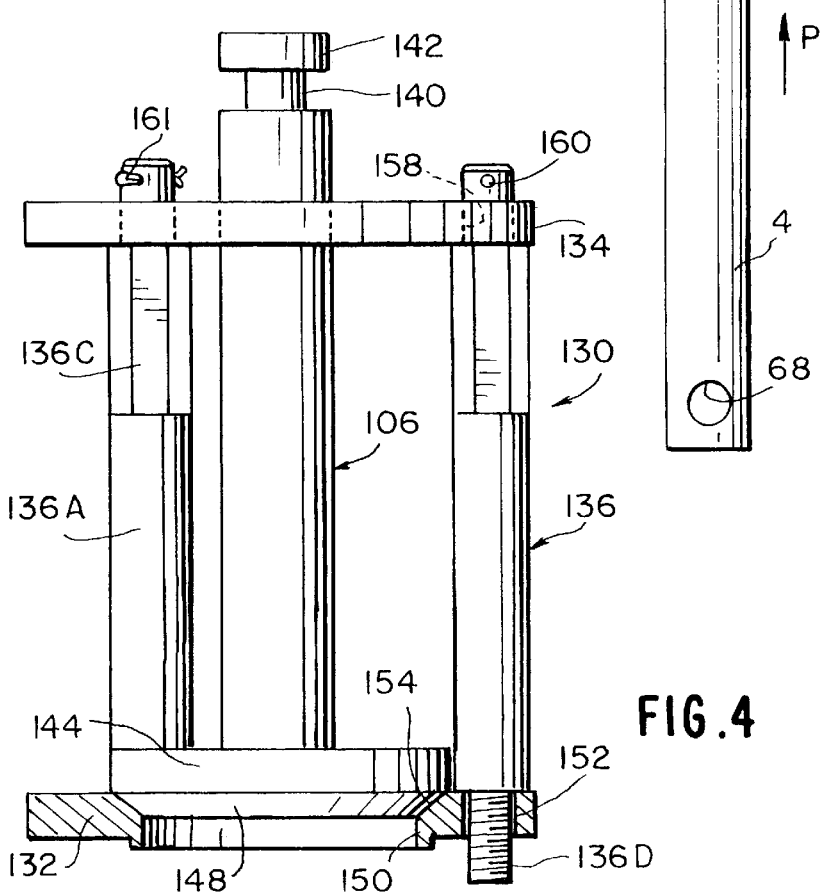

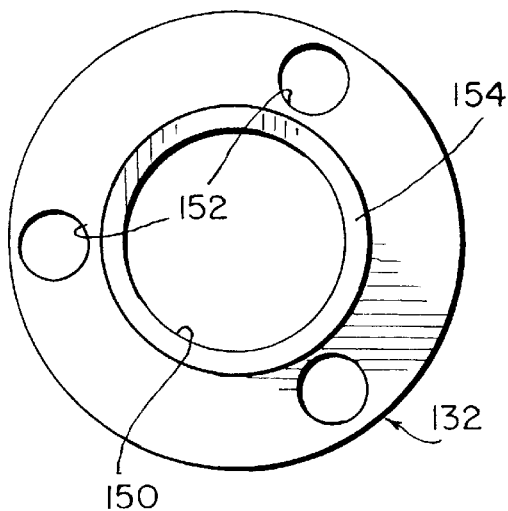
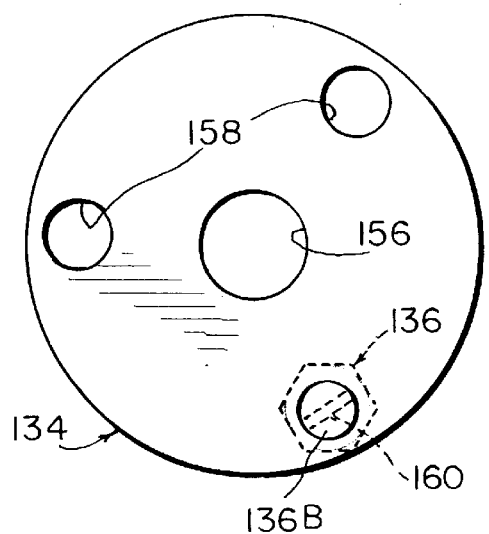
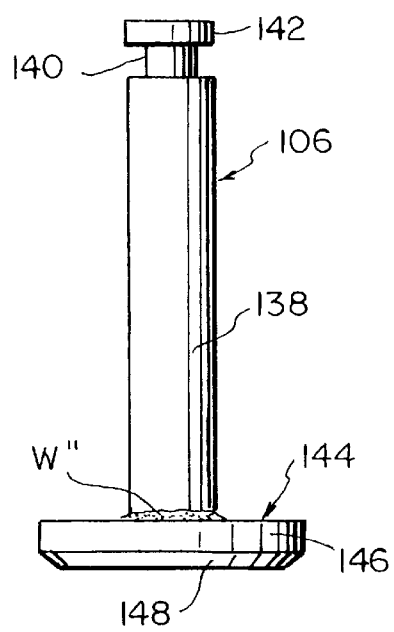
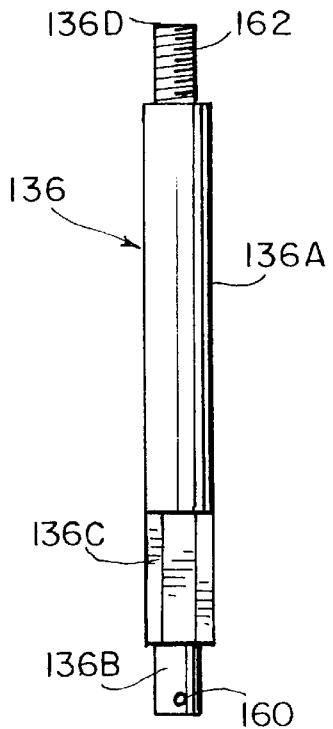

MULTI-COMPRESSION COIL SPRINGS FOR A LIQUID PUMP

FIELD OF THE INVENTION

This invention relates to float-operated over-center valve actuating mechanisms for liquid pumps, wherein a pressure vessel is alternatively filled with a liquid and emptied with pump operation controlled by the level of the liquid acting on a float operated over-center valve actuating mechanism which subjects oppositely acting chamber vent and operating gas pressure inlet valves to a high compressive preload force which increases as the mechanism toggle linkage moves alternatively across an over-center position, and more particularly to such liquid pumps or an over-center valve actuating mechanism useful therein, which employs a plurality of stiff, short axial length, large wire diameter, large coil diameter compression coil springs to permit pump operation at very high internal vessel pressure, and to a stand-off mounting plate assembly for utilizing a single, large diameter poppet valve plug as a single vent valve which is guided via a three-point contact with stand-off rods extending parallel to the valve stem and spaced 120 degrees about the poppet valve plug.

BACKGROUND OF THE INVENTION

Over-center, float-operated valve actuating mechanisms have evolved in the past few years, which are highly useful in controlling the filling or near filling of a closed or sealed pressure vessel, which vessel includes a vent valve for venting the interior of the vessel to the atmosphere, and a second pressure gas inlet valve subjected to a high pressure inlet gas, such as live steam at 100 to 500 psi to drive an accumulated liquid periodically from the vessel. One such mechanism is the subject matter of U.S. Reissue Patent RE-34,957 entitled "LEAK PROOF, PRELOADED, HIGH-BIASING FORCE FLOAT-OPERATED OVER-CENTER VALVE ACTUATING MECHANISM" to this applicant and reissued May 30, 1995. The content of this Reissue Patent RE-34,957 is incorporated herein by specific reference.

The over-center valve actuating mechanism of the '957 patent is characterized by a relatively short axial length, large coil turn diameter, stiff compression coil spring having a large spring constant and being subject to spring preloading. Such is not subject to distortion under high preload and the load forces incurred during opening and closing of the valves. The compression coil spring of relatively large coil turn diameter and short length functions adequately as one of the two over-center links while exerting a high biasing force on the over-center valve actuating mechanism.

The over-center toggle linkage valve actuating mechanisms to which the present invention has application is not limited to a toggle linkage mechanism in which a compression coil spring is employed, indeed the invention has application to applicant's U.S. Pat. No. 5,426,990 entitled "OVER-CENTER TOGGLE LINKAGE VALVE ACTUATING MECHANISM WITH ADJUSTABLE TENSION SPRING PRELOADING", issued Jun. 27, 1995 and which is characterized by a toggle linkage mechanism comprised of two solid links, one is of adjustable length relative to the other for preloading one or more tension springs tending to bias the toggle linkage in alternate, cross-over center positions, with the bias maintained continuously throughout the toggle linkage movement to alternate oppositely oblique over-center positions. Further, both of these patents to the applicant are directed to valve actuating mechanisms in which there is no movement of the valve actuator until the two toggle links move into exact alignment at the over-center position, and wherein instantaneously the pressure gas inlet valve and the gas outlet or gas vent valve instantly, alternately open and close.

While the float-operated over-center valve actuating mechanisms of applicant's patents discussed above constitute major improvements within the liquid pump field, such pumps as devised are limited in terms of capacity and internal pressure capability. Attempts have been made to create larger pumps for increased capacity, requiring increased internal pressure for effective operation. The results to date have been disappointing. The simple expedient of increasing the number of gas inlet valves and vent valves allows pump operation, but capacity is still limited.

The applicant is aware of one attempt to manufacture and sell a large condensate pump using direct valve on-off operation. In a first attempt using two valves, a single pressure inlet valve and a single vent valve failed. It is believed that the single valves were simply too large or poorly designed.

In a second known attempt at the creation of a large capacity pump of this nature, a pilot signal from a small valve inside the pressure valve is employed to open an external pilot valve operated by a large valve, which in turn sends pressure into the vessel to pump out whatever liquid or condensate accumulates therein. This leads to a delay between the time the small valve inside the tank opens by its trip point, and pressure is sent through piping back outside the tank to a pilot operated valve. With the pilot pressure being satisfied, the pilot valve opens and operation is effected. Such operation is neither instant nor precise.

It is, therefore, a primary object of the present invention to provide an improved snap-acting, over-center valve actuating mechanism for large capacity liquid pumps having high internal pressure within the pump vessel, which is useful both with compression coil biasing springs and tension springs, which preferably employs a plurality of relatively short axial length, stiff compression coil springs having large spring constant and being of relatively large coil spring diameter, in which the mechanism includes a plurality of balanced coil springs in which the opened and closed gas pressure and vent valves remain in their current state until the over-center toggle linkage moves into alignment and crosses over center, and in which a single vent valve takes the form of a poppet valve assembly having a plurality of circumferentially spaced stand-off rods making three-point contact with the periphery of the poppet valve plug for guiding the poppet valve during the full stroke movement upon valve opening and closing with ensured full seating of the poppet valve plug onto a conical valve seat.

BRIEF DESCRIPTION OF THE DRAWINGS

FIG. 3 is an enlarged side elevational view of the gas pressure inlet valve and poppet type vent valve assembly of the mechanism of FIGS. 1 and 2.

FIG. 4 is an inverted side elevational view of a vent valve assembly forming a major component of the invention.

FIG. 5 is a side view of one of the vent valve stand-off rods of the assembly FIG. 4.

FIG. 6 is a top plan view of the valve seat component of FIG. 4.

FIG. 7 is a top plan view of the guide plate of the assembly of FIG. 4.

FIG. 8 is a front elevational view of the poppet type valve of the assembly of FIG. 4.

DETAILED DESCRIPTION OF THE PREFERRED EMBODIMENT

Figure 1:
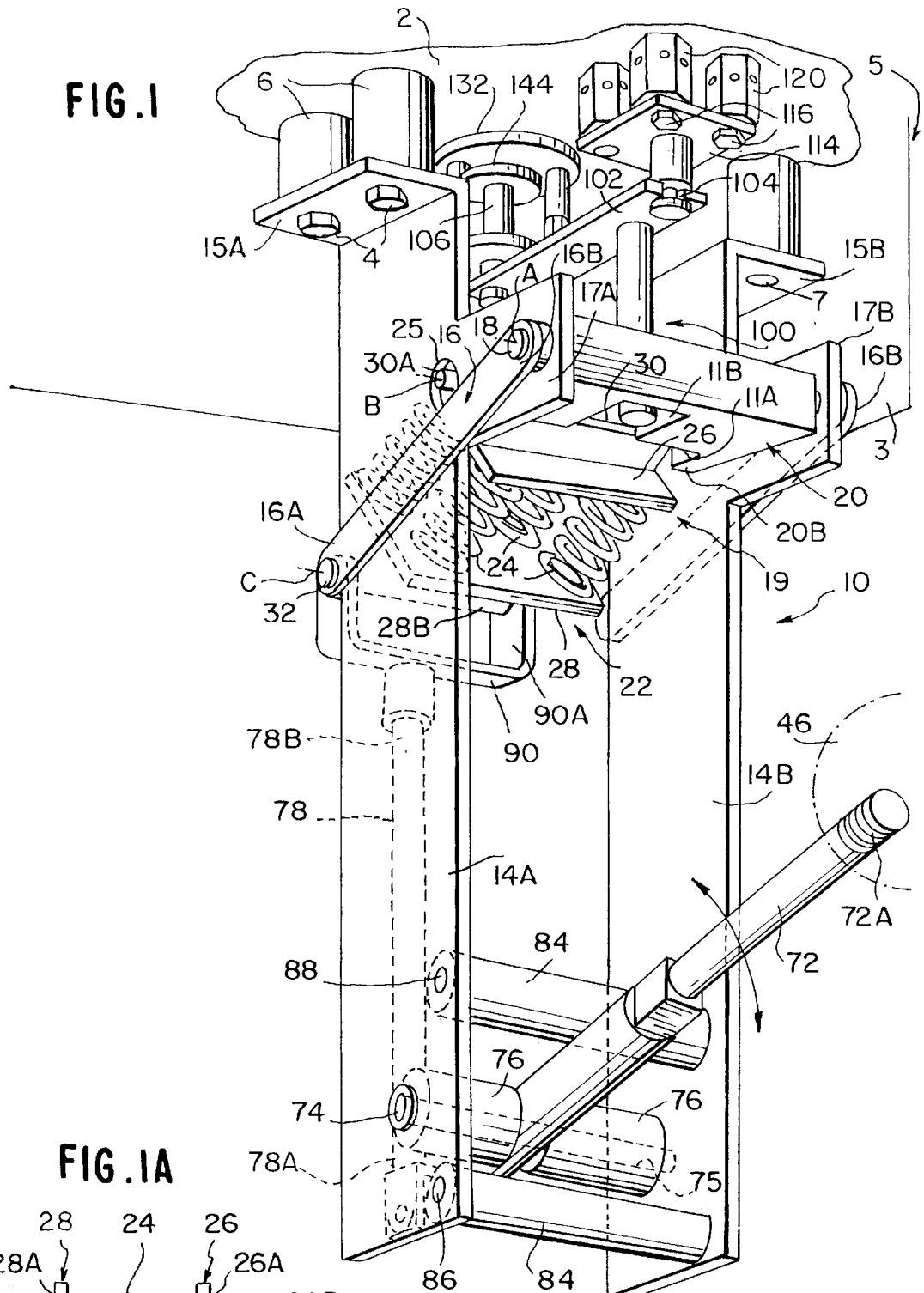
FIG. 1 is a perspective view of a four-compression coil spring biased, float-operated, over-center valve actuating mechanism forming a preferred embodiment of the invention for use within a liquid pump pressure vessel in gas pressure inlet valve open position.

Referring to the drawings, the figures illustrate the improved over-center valve actuating mechanism of the present invention, indicated generally at 10, as a preferred embodiment and suspended downwardly from a horizontal, transversely extending mechanism mounting plate indicated generally at 2, FIG. 1. The mounting plate is, in turn, fixed inside of a pressure vessel indicated generally at 5, the vertical wall 3 of which is partially shown in FIG. 1 and to which the mounting plate 2 is fixed at opposite ends.

The vertical mounting arrangement is similar to that of the Reissue Patent RE-34,957. This invention is like that of RE-34,957, but utilizes four side-by-side, symmetrically arranged gas inlet valves similar to that illustrated at 6, FIG. 1A of the RE-34,957. As will be appreciated hereinafter, the present invention utilizes a single gas exhaust or vent valve, which vent valve is quite dissimilar from the vent valve 7 shown in FIG. 1A of the RE-34,957.

The high biasing force multi-short axial length stiff, large spring constant compression coil spring type float-operated, over-center valve actuating mechanism 10 is provided with two oppositely directed L-shaped main frame sidewalls 14A, 14B terminating, respectively, in right angle flanges 15A, 15B at their upper ends, which are bolted to the bottom of mechanism mounting plate 2 by bolts 4 which pass through holes 7 within the flanges and which extend through cylindrical stand-offs 6. The bolts 4 are, in turn, fixedly mounted to the mounting plate 2 in the conventional manner. One of the bolts 4, to the right, is removed to show the existence of the hole 7 through which the bolt passes within flange 15B. The flanges 14A, 14B therefore form an open framework for mounting the remaining mechanism of the components 10. A float arm 72 is threaded at its outer end at 72A and has threadably attached thereto a spherical hollow body or float shown in dotted lines at 46. The force for operating the over-center toggle linkage is achieved by the float 46 moving up and down on the liquid accumulating within vessel 5. The over-center toggle linkage valve actuating mechanism 10 is essentially identical to the embodiments of the RE-34,957 with the exception of the multiple compression coil spring assembly indicated generally at 22, and the makeup of the pressure and vent valve assembly indicated generally at 100.

The balance of the toggle linkage, over-center valve actuating mechanism 10 and its mode of operation is much like that of RE-34,957. A shaft or axle 74 extends at right angle between sidewalls 14A, 14B near the bottom of the main frame 14 and projects through the center of float arm 72 at right angles to its axis, intermediate of its ends. The shaft 74 receives the bores 75 of a pair of cylindrical spacers 76. The float arm rotates about the axis of shaft 74, with the cylindrical spacers 76 maintaining the float arm properly positioned intermediate of the two sidewalls 14A, 14B. The shaft or axle 74 may be welded at its ends or otherwise fixed to opposite sidewalls 14A, 14B of the main frame 14 and spacers 76 are loosely, slidably mounted on the shaft 74 so as to freely rotate while still functioning to laterally center the float arm 72 between those walls. The sidewalls 14A, 14B may be separate from each other or may be joined at their bottoms to form an integral U-shaped main frame structure.

Figure 1A:
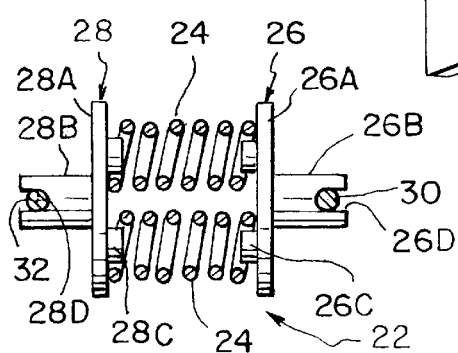
FIG. 1A is a side elevational view of a compression coil spring assembly of the mechanism of FIG. 1.

A back link 78 of cylindrical rod form extends vertically along the rear of the open main frame 14 having a lower end 78A articulated to the end of the float arm 72 remote from float 46 via a pivot pin 82. Rotation or swinging of the float arm 72 through a limited arc F, FIG. 1, is limited by bumpers or vertical stops of cylindrical form mounted above and below axle 74, at 84 and 86, respectively. This is achieved by through bolts 88, which pass through open frame sidewalls 14A, 14B at opposite ends of the bumpers. The upper end of the back link 78B has fixedly coupled thereto a yoke 90 which transmits the lifting and dropping forces developed by the float 46 to the toggle linkage of mechanism 19. The toggle linkage mechanism indicated generally at 19 is comprised of two links, a flat U-shaped block indicated generally 20 and the compression coil spring assembly 22, with the confronting ends of block 20 and compression coil spring assembly 22 being pivotally coupled to each other via a pivot pin or shaft 30. The compression coil spring assembly 22 as per FIG. 1A is formed principally of upper and lower T-shaped coil spring end plates 26, 28 and four short axial length compression coil springs 24 interposed therebetween and sandwiched by the T-shaped coil spring end plates 26, 28. The coil springs 24 are purposely sized such that the diameter of the turns of the coil spring are large, the overall coil spring length is short relative to the diameter of the turns. That length is preferably no more than four times the coil spring turn diameter. Further, the wire forming the coil springs is of relatively large diameter so that a very high spring constant or spring rate is provided. As such, each compression coil spring is quite stiff, each is identical and each provides one fourth of the spring biasing force to the valve actuating assembly 100. End plates 26, 28 are mirror images of each other, they have oppositely directed central raised portions such as that at 26B of the thin plate form base 26A. The same is true for the lower T-shaped end plate 28 whose base 28A includes a longitudinal, downwardly directed central projection 28B.

The bottom surface of the end plate 26 is provided with circular projections or bosses 26C which project outwardly a short distance and have diameters slightly less than the internal diameter of the compression coil springs 24 at the four corners of the plate 26. The end plate 28 is provided with similar circular projections or bosses 28C on the flat surface of the same, opposite the surface bearing projection 28B, which bosses are mirror images to those of end plate 26. Axially aligned opposed bosses 26C, 28C of end plates 26, 28, respectively, for each coil spring 24 ensure proper positioning of the coil springs 24 throughout the extent of retraction and expansion of the same during over-center toggle link movement.

A semi-circular groove 26D is formed within the outer face of projection 26B, and a similar groove 28D is formed within the central projection 28B of end plate 28. The semi-cylindrical groove 28D receives a pivot pin 32 which extends through the vertical sidewalls 90A of yoke 90 and which further extends through cylindrical holes within the lower end 16A of a pair of spring preload arms 16. Shaft 32 may bear cotter pins or the like through transverse holes within the ends of those members to opposite sides of the yoke 90 and outside of the spring preload arms 16 in the manner of RE-34,957. The pivot pin 32 forms a pivot axis C identical in nature and operation to that of the two embodiments within RE-34,957. Within groove 26D the pivot pin 30 partially resides, the pivot pin having end portions 30A at opposite ends which project through circular holes 25 within the respective sidewalls 14A, 14B of the main frame 14. The circular holes 25 are significantly larger in diameter than that of the end portions 30A of pivot pin 30.

Figure 2:
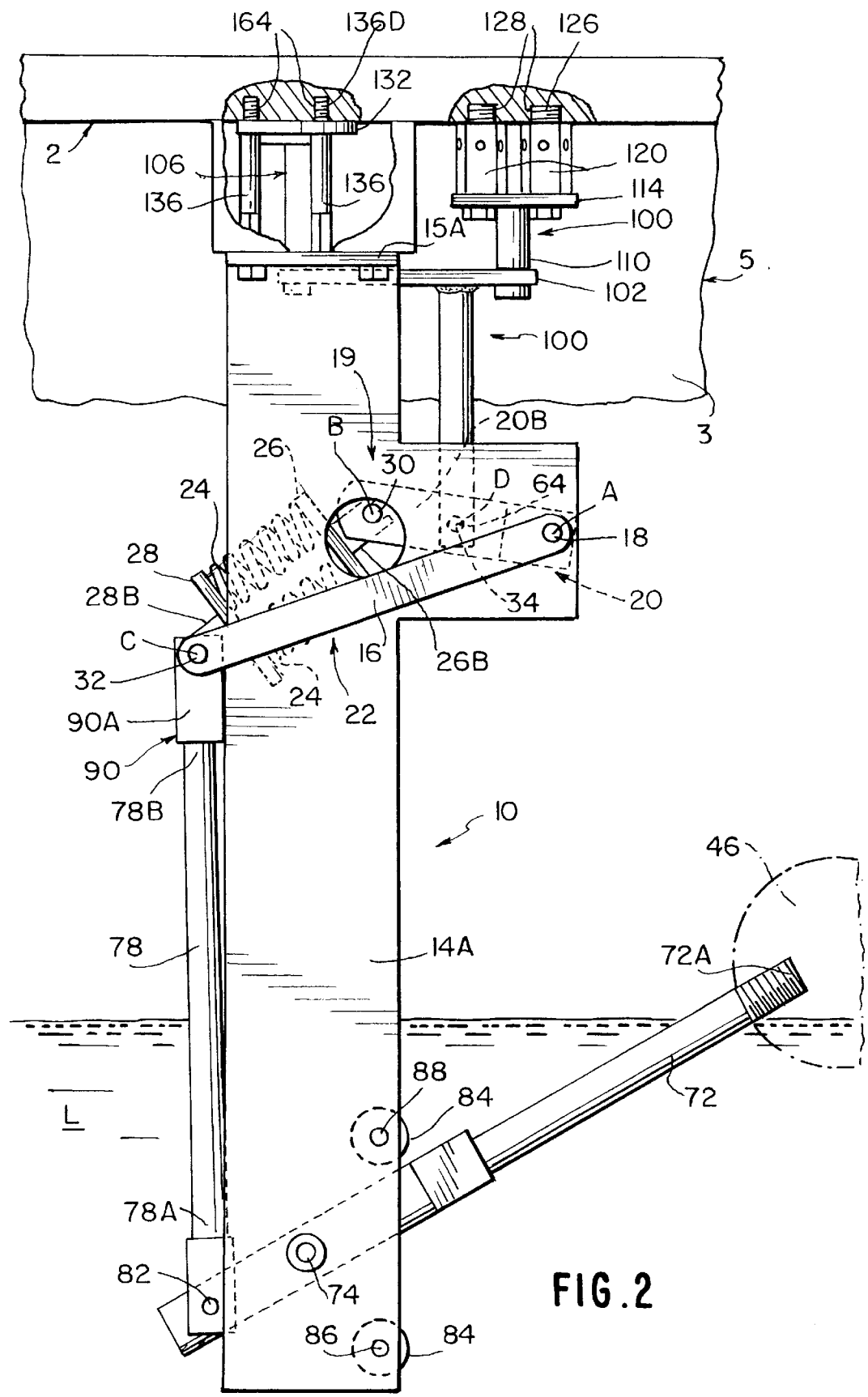
FIG. 2 is a side elevational view, partially broken away, of the mechanism of FIG. 1.

As may be seen best in FIGS. 1 and 2, the pivot pin 30 is of relatively small diameter, and in addition to being received within the longitudinal groove 26C at the upper edge of the projection 26B of end plate 26, projects through a pair of aligned transverse holes or bores within opposite sidewalls 20B of toggle link 20. The overall length of the pivot pin 30 is such that the opposite ends 30A project outwardly beyond the block 20B sidewalls and extend through respective circular holes 25 within the sidewalls 14A and 14B of the main frame 14. Block 20 is essentially the same as yoke 20 within the first embodiment of RE-34,957 and forms one of the toggle links of toggle link assembly 19. A further pivot pin 18 extends through a transverse bore within toggle block 20 through aligned holes within rectangular extensions 17A, 17B of main frame sidewalls 14A, 14B and within aligned circular holes within ends 16B of the respective compressive force spring preload arms 16. The length of links 20 and 22 are sized such that the compression coil springs 24 are under a preload force, and are further compressed until passed over center, limited by the diameter of the holes 25 within main frame sidewalls 14A, 14B. They are under much higher biasing force when the links 20 and 22 come into alignment as discussed in detail for the corresponding, but slightly different arrangement within RE-34,957.

As seen in FIG. 2, a further pivot pin 34 is fixedly mounted within aligned apertures or holes drilled within the rear of the toggle link block 20, through a grooved portion of the block, towards the front, but stopping short thereof. The groove is the widest at 11A so as to receive the projection 26B at the center of the end plate 26, which opens to a much narrower slot portion 11B through which passes pivot pin 34. The pivot pin extends through a slightly larger bore 63 of a valve actuator rod 4, whose end remote from cross bore or hole 63 is welded at W to a common valve actuator plate 102 forming components of the gas pressure and vent valve assembly 100, FIG. 3.

The valve actuator plate 102 is of elongated, narrow strip form and carries short length narrow slots 104, FIG. 1, over a short distance, extending inwardly along the center line of the valve actuator plate from each end. The slots 104 permit mounting of a poppet type vent valve adjacent end 102A of the valve actuator plate 106 and a pressure gas inlet valve plunger indicated generally at 108 adjacent the opposite end 102B of the valve actuator plate 102 within short length slot 104 at that end. The gas pressure inlet valve plunger 108 is formed of two parts. A stainless steel rod 110 has a reduced diameter portion 110A intermediate of its ends sized slightly smaller than the width of slot 104, within which it is received. The reduced diameter portion 110A defines a circular cap as a stop at 112. The rod 110 is welded at the opposite end at W' to a transverse pressure plate 114 of rectangular plan form which overlies four identical gas inlet valves 120 similar to that at 6 at FIG. 1A of RE-34,957. Preferably, pressure plate 114 is of square plan configuration with the gas pressure inlet valves 120, being symmetrically arranged and spaced from each other to overlie plate 114, adjacent to the respective four corners of that plate. Similar to the valve setup and plunger operation at 4d, FIG. 1A of RE-34,957, the exterior valve bodies 122 of each valve 120 are provided with multiple transverse holes or apertures 124. This permits the high pressure gas such as steam to enter the interior of the vessel through the holes or apertures at 124 as the valve actuator 4 rod is moved in the direction of arrow P, FIG. 3.

As may be appreciated, each of the gas pressure inlet valves 120 terminate in externally threaded mounting studs 126, which are screwed into tapped holes 128 within mounting plate 2 interiorly of the vessel 4, FIG. 2. Similar to the gas pressure inlet valve 6 of FIG. 1A of RE-34,957 when the gas pressure inlet valve plunger 108 or push rod moves upwardly, driven by the valve actuator plate 102, vertical pins (not shown) internally of the valve bodies 120 drive an inlet ball (not shown) off a circular seat of the gas pressure inlet valves 120, identical to the action as described in RE-34,957 and shown in FIG. 1A.

The high pressure inlet gas such as steam rushes into the interior of the vessel 5 to pressurize the vessel interior at pressures in excess of 500 psia. The vertical pin travel for all four gas pressure inlet valves 120 is identical, and the inlet valves 120 open and close simultaneously. Bolts 116 carried by pressure plate 114 adjacent to the four corners fixedly couple the vertical pins internally of the valve bodies 122 to pressure plate 114 so as to effect simultaneous drive of all four pins for the four valves 120.

Referring particularly to FIG. 3 and FIGS. 4–7, a major aspect of the present invention is directed to a vent valve and guide assembly indicated generally at 130. The vent valve and guide assembly 130 in FIG. 3 is shown inverted, that is the valve is upside down from that shown in FIG. 4. FIG. 4 more clearly relates the nature of the assembly prior to installation within the vessel 4, FIG. 1. In addition to the poppet type vent valve 106, the assembly 130 includes a circular combined guide plate and valve seat indicated generally at 132, FIG. 6, a circular guide plate indicated generally at 130, FIG. 7, and a number (three) of stand-off valve guide rods indicated generally 136, FIG. 5.

FIG. 8 shows a front elevational view of the poppet type vent valve 106 prior to the completion of the assembly 130, FIG. 4. The combined guide plate and valve seat 132 is of circular disk form, being relatively thin in vertical height and having a diameter identical to that of guide plate 134. Further, the combined guide plate and valve seat 132 includes a relatively large diameter axial bore 150 and a radially enlarged chamfer 154 extending radially outwardly therefrom on the upper surface of plate 132, matching the 45° chamfer 148 given to adjacent outer bottom surfaces of the periphery of the vent valve plug. Extending through the combined guide plate and valve seat 132 from the top to the bottom are three equally circumferentially spaced circular holes 152, matched by similar, identically circumferentially spaced holes 158 passing through the guide plate 134 from top to bottom. The guide plate 134 is further provided with a central bore or hole 156 sized slightly larger than the stem 138 of the vent valve 106. The combined guide plate and valve seat 132, and the guide plate 134 function to vertically support the three stand-off valve guide rods 136 in near peripheral contact with the plug 144 of the poppet type vent valve 106. The stand-off valve guide rods 136 have a smooth surface central portion 136A of given diameter, a reduced diameter portion 136B at one end which is received within the respective circumferentially spaced holes 158 within guide plate 134, with the guide plate 134 resting on a hex configured portion 136C of the stand-off valve guide rod between portion 136B and the central portion 136A. The opposite ends of the stand-off valve guide rods further include reduced diameter portions 136D bearing threads 162 which pass through respective circumferentially spaced holes 152 within the combined guide plate and valve seat 132, FIG. 4. The diameter of the holes 152 within the combined guide plate and valve seat are slightly less than the diameter of the threaded portion 136D of the stand-off valve guide rods. The threaded reduced diameter portions 136D of the stand-off valve guide rods are received, respectively, within three circumferentially spaced, tapped holes 164 within the mounting plate 2 borne by the vessel 4, FIG. 2.

The poppet type vent valve 106 as shown in FIG. 8 includes a valve stem 138 of elongated cylindrical form, which is welded at W'" to the top surface of a vent valve plug 144. The plug 144 is also of disk form having a diameter significantly greater than that of the valve stem 138 and having an outer periphery, whose diameter is in excess of the bore 150 and equal to the outer diameter of the chamfered valve seat 154. The chamfer angle on the face of the valve plug opposite to that of the stem 138 is equal to that of the chamfer defining the valve seat 154 within the top of the combined guide plate and valve seat 132.

Assembly is easily accomplished by placing the combined guide plate and valve seat on a flat support surface as per FIG. 4 and permitting the vent valve 106 to be coaxially aligned with the bore 150 of the combined guide plate and valve seat. The vent valve 106 is lowered to the position shown in FIG. 4 and centered with the combined guide plate and valve seat. The three stand-off valve guide rods 136 are then positioned as shown in FIG. 4, with their threaded ends 136D projecting through the circumferentially spaced holes 152 within the combined guide plate and valve seat 132. Next, the guide plate may be slid down over the end of the valve stem 106 remote from the plug 144, with the central hole or bore 156 of the guide plate receiving the portion of the stem 138 bearing a circular groove 140, defining a cap or head 142. Cotter pins (not shown) may then be inserted within holes 160 within the reduced diameter portions 136B of the three stand-off valve guide rods. The diameter of the plug 144 is machined so as to just fit inside the three vertically upright stand-off valve guide rods 136. As a result, the plug is centered relative to valve seat 154. During relative movement between the vent valve 106 and the combined guide plate and valve seat 132 over the full extent of the central portion 136A of the stand-off valve guide rods 136, the plug 144 makes light vertical line contact at three 120° circumferentially spaced positions on the periphery 146 of the valve plug 144 and the smooth exterior surface of the central portions 136 of the stand-off valve guide rods. Once the assembly 130 is completed as per FIG. 4, cotter pins or the like at 161 may be inserted through cross bores 160 within ends 136B of the stand-off valve guide rods to maintain the guide plate 134 in its proper position relative to the assembly.

Assembly 130 is then inverted and mounted to the bottom of the mounting plate 2 internally of the vessel as per FIG. 2, via threaded ends 136D of rods 136, threaded into tapped holes 164 of mounting plat 2. After mounting or before mounting, the valve actuator plate 102 is aligned with the axis N of the vent valve 106 and the slot 104 of the valve actuator plate receives a necked down portion of the valve stem 138 as defined by peripheral groove 140.

It should be noted that the valve actuator rod 4 welded at W to the lower face of valve actuator plate 102 is much closer to end 102B of the valve actuator plate than it is to end 102A. As a result, there is an unequal distribution of forces acting on the vent valve 106 and the pressure plate 114 to open the vent valve 106 while closing the gas pressure inlet valves 120 and vice versa during the over-center snap action effected by the toggle linkage 119 under the bias of the compression coil springs 24 of assembly 22. When the interior of the vessel is devoid of the highly pressurized steam or other gas under pressure, there is a large force developed on the balls of the multiple (four) gas pressure inlet valves 120 tending to maintain the inlet valve closed in the vent valve open position. The offset of approximately 4:1 between the dimensions W1 and W2, FIG. 3, ensure the balance of loads on the system valve components. To open the four gas pressure inlet valves 120, most of the force developed by the four compression coil springs 24 going over center must be applied through gas pressure inlet valve plunger 108 and pressure plate 114 uniformly to the four gas pressure inlet valves 120 to unseat and open the balls against the upstream steam pressure.

With the compression coil springs 24 of a length not exceeding four times the diameter of the coil springs, the springs can be readily compressed without buckling or twisting, thereby requiring no need for a continuous guide or support over the length of the respective coil springs 24.

The operation of the preloaded, high-biasing force float-operated over-center valve actuating mechanism for use in a sealed pressure vessel having a top mounting plate suspending the mechanism 10 follows that of the embodiment at FIG. 5 in applicant's patent RE-34,957. The sequence of operation may be best seen by reference to FIG. 2. Assuming that the conditions are just after a change in state of the mechanism and valve setup as shown in FIG. 2 involving the toggle links 20, 22 have snapped into an opposite upright inclined or oblique position, from where the links 20, 22 were obliquely down and towards each other on the opposite side of the force preload arms 16. The valve actuator rod 4 is then in its uppermost position. The vent valve would have its plug sealed to seat 154, with the poppet type vent valve in the closed position, while the four gas pressure inlet valves 20 are just opened. The interior of the vessel is being highly gas (steam) pressurized and the liquid L accumulated within the vessel drops to cause the float 46 to lower.

As the float lowers to follow the float 46, the vessel empties, float arm 72 rotates clockwise, FIG. 2, drawing back link upward, and the coil spring preload arms 16 rotate clockwise about pivot pin 18 to move into a position of alignment with the solid link 20 and the compression coil spring link assembly 22, causing the coil springs 24 to compress under much greater spring load than at compressor coil spring preload in their semi-relaxed state. The moment that the arms 16 pass over center, that is through a center line drawn from pivot axis A to pivot axis C through pivot axis B, the links 20, 22 immediately snap over into the opposite downwardly oblique. The compression force of the springs 24 is high enough, particularly resulting from the offsetting of the valve actuator rod 4 on the valve actuator plate 102, much closer to the axis M of the gas pressure inlet valve plunger 108, so that most of the developed force by the expansion of the coil springs 24 is delivered through the pressure plate 114 to seat and close the balls within the gas pressure inlet valves 120, which balls are driven subject to intense gas pressure (steam) as high or higher than 500 psia. With gas pressurization within the vessel, the poppet type vent valve quickly opens, as little of the coil spring operated force is required to achieve that action, and the reaction forces on the assembly of FIG. 3 are well balanced between the four gas pressure inlet valves 120 and the single poppet type vent valve 106.

The intense steam pressure at 500 psia or greater rapidly pumps the accumulated liquid L through an outlet fitting of the pump body or vessel 4. The low friction pivot connection made by pins 30 and 32 to end plates 26, 28, respectively, permit the springs 24 to compress while freely pivoting about axes B, C without any movement whatsoever of block or yoke 20 until the toggle linkage 19 reaches its centerline position with the energy of the further compressed coil springs 24 rapidly causing the coil springs to expand and effecting snap action movement of both links into their oppositely oblique positions.

Utilizing the circular holes 25 within laterally opposed sidewalls 14A, 14B in the manner of RE-34,957, opposite ends of pivot pin 30 or the mechanism in similar fashion to RE-34,957 may bottom out selectively against the periphery of the holes 25 in one of the up or down strokes, or both. If the periphery of hole 125 does not act as a physical stop, the valves themselves as at 120, 106 terminate movement of the links after passing over center in each direction. Similar to the end caps in RE-34,957, the short axial length relatively large turn diameter of the compression coil springs ensure that the springs regardless of compression or expansion maintain their alignment with the bosses on which the opposite ends of the springs mount without twisting, bending or the like to sustain preload compression and to provide high additional compression loads during link movement towards an in line or centerline position and prior to passing therethrough.

As such, pivoting of the spring assembly 22 as the second link is as friction-free as possible at opposite ends thereof. Preferably, all components of the float-operated, high biasing force toggle linkage valve actuating mechanism may be formed of stainless steel, with the coil springs 24 purposely sized such that the diameter of the turns of the coil springs are large. The overall coil spring length is short relative to the diameter of the turns of the coil spring, with the length of the coil spring being not in excess of four times the coil turn diameter. As a result, the spring constant or spring rate is quite large. Such stiff compression coil springs have an extremely long life.

It should be understood, however, that various changes in the form and proportion may be resorted to within the scope of the appended claims, and the claims are not limited to examples described in detail herein.

What is claimed is:

1. In a high-biasing force, float-operated toggle link over-center valve actuating mechanism for use in a sealed pressure vessel having a bottom and a top, the bottom including a liquid inlet opening and a liquid outlet opening; said top having a gas inlet adapted to be connected to a compressed gas source, a gas outlet, inlet valve means controlling the gas inlet, outlet valve means controlling the gas outlet, said valve actuating mechanism alternately opening and closing said inlet and outlet valve means by first opening said gas outlet valve means and second closing said gas inlet valve means, and under reverse snap-over toggle valve actuation closing the outlet valve means and simultaneously opening said gas inlet valve means, said snap-over toggle linkage valve actuating mechanism further comprising:

a relatively fixed main frame for support internally of said vessel, at least one compression force preload arm pivotally mounted to said fixed main frame for pivoting about a first pivot axis A, a first toggle link pivoted at a first end to said main frame about said first pivot axis A, a second toggle link operatively pivoted at a first end to said compression force preload arm at a point in said arm remote from said pivot axis A, for pivoting about a second pivot axis C parallel to said first pivot axis A, pivot means pivoting a second end of said first toggle link to a second end of said second toggle link for pivoting about a third axis B parallel to said first and second pivot axes A, C, coupling means for operatively coupling said float to said at least one compressive force preload arm at a point remote from said first axis A, and said second toggle link comprising compressible and expandable means for constantly applying a compressive force on said pivot connection between said first and second toggle link, such that upon pivoting of said at least one compressive force preload arm by rise and fall of liquid within said vessel about said first pivot axis A towards a position of longitudinal alignment with the longitudinal axis of one of said first and second toggle links, an increasing compressive force is applied to said first toggle link to maintain the first toggle link stationary in one of two oblique, over-center positions with respect to a centerline extending parallel to the longitudinal axis of said at least one compressive force preload arm, and said second toggle link pivots about said axis B and said compressible and expandable means axially compresses until said first and second links become longitudinally aligned and move across the centerline, whereupon both toggle links instantly snap over into oppositely oblique, over-center positions, and said second toggle link compressible and expandable means expands to dissipate the energy of compression, the improvement wherein:

said compressible and expandable means comprises a plurality of stiff, short axial length large coil turn diameter compression coil spring sandwich mounted at opposite ends between two facing end plates in side-by-side symmetrical position, said plurality of compression coil springs having axial lengths less than four times the diameter of said coil spring turns, and means for maintaining said plurality of compression coil springs between said two facing plates under precompression and forming a multiple compression coil spring assembly.

2. The mechanism as claimed in claim 1, wherein said multiple compression coil springs comprise said second toggle link.

3. The mechanism as claimed in claim 2, wherein said plurality of stiff compression coil springs are four in number, said end plates are rectangular in form, and said four compression coil springs are symmetrically arranged at the four corners of said two facing end plate.

4. The mechanism as claimed in claim 3, wherein said end plates have raised circular bosses on the facing surfaces of said rectangular end plates at said four corners sized to and receiving opposite ends of respective coils for maintaining said compression coil springs in alignment while permitting free expansion and contraction of said compression coil springs.

5. The mechanism as claimed in claim 1, wherein said gas inlet valve means comprises a plurality of inlet valves fixedly mounted to said vessel internal to a transverse mounting plate in proximity to the top of said vessel and internally of the same, wherein said gas outlet valve means comprises a poppet valve assembly including a large diameter poppet type plug valve, said poppet type gas outlet valve comprises an elongated cylindrical valve stem terminating in a radially enlarged poppet valve plug at one end of said valve stem, a valve seat plate having an axial bore, a chamfered annular valve seat on one side of said plate radially outwardly of said bore and facing said poppet valve plug and being sized and configured to a chamfer on said plug adjacent the outer periphery of said plug, a stand-off mounting plate spaced axially from said valve seat plate, a center bore within said stand-off mounting plate sized slightly larger to and slidably receiving said poppet valve stem, three equally circumferentially spaced circular holes in said stand-off mounting plate, stand-off rods extending through respective ones of said circular holes, providing three-point contact, with the periphery of said poppet valve plug to guide said valve plug during opening and closing of said poppet valve, a reciprocating valve actuator rod operatively coupled to said first toggle link at one end of said valve actuator rod, a valve actuator plate fixedly mounted to an opposite end of said valve actuator rod and being operatively coupled to the valve stem of said poppet type vent valve and being operatively coupled to said plurality of gas pressure inlet valves, whereby projection and retraction of said valve actuator rod causes said plurality of gas pressure inlet valves and said poppet type vent valve to simultaneously open and close and to close and open, respectively during opposite direction movement of said valve actuator rod.

6. The mechanism as claimed in claim 5, wherein said valve actuator plate detachably mounts a gas pressure inlet valve plunger at one thereof and to one side of said valve actuator rod, and said valve actuator plate detachably carries at the opposite end of said valve actuator plate said valve stem of said poppet type outlet valve, and wherein said valve actuator rod is fixedly mounted to said valve actuator plate at a lateral position proximate to said gas pressure inlet valve plunger and remote from said poppet type outlet valve, whereby the biasing force of said compressible and expandable means is concentrated on said gas pressure inlet valve plunger for actuation of said plurality of gas pressure inlet valves.

7. The mechanism as claimed in claim 5, wherein said gas pressure inlet valve plunger terminates in a pressure plate sized to and underlying said plurality of gas pressure inlet valves.

8. The mechanism as claimed in claim 6, wherein the distance from a center line of said valve actuator rod to a center line of said gas pressure inlet valve plunger is approximately four times less than the distance from the center line of said valve actuator rod and a center line of the valve stem of said poppet type outlet valve.

* * * * *